(12) United States Patent
Anders et al.

(10) Patent No.: US 11,498,147 B2
(45) Date of Patent: Nov. 15, 2022

(54) SINGLE PHASE INPUT DETECTION AND POWER SOURCE PROTECTION

(71) Applicant: ILLINOIS TOOL WORKS INC., Glenview, IL (US)

(72) Inventors: Adam E. Anders, Oshkosh, WI (US); Randy Decoster, Appleton, WI (US); Andrew D. Nelson, Appleton, WI (US); Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 472 days.

(21) Appl. No.: 15/968,464

(22) Filed: May 1, 2018

(65) Prior Publication Data
US 2019/0337081 A1 Nov. 7, 2019

(51) Int. Cl.
*B23K 9/095* (2006.01)
*B23K 9/10* (2006.01)

(52) U.S. Cl.
CPC ................ *B23K 9/1062* (2013.01)

(58) Field of Classification Search
CPC .......... B23K 9/06–067; B23K 9/073; B23K 9/09–093; B23K 9/095–0956; B23K 9/10–1025; B23K 9/1043–105; B23K 9/1056–1062; B23K 9/1068
See application file for complete search history.

(56) References Cited

U.S. PATENT DOCUMENTS

| | | | | |
|---|---|---|---|---|
| 5,149,940 A | * | 9/1992 | Davis | B23K 9/073 219/130.21 |
| 6,111,216 A | * | 8/2000 | Stava | B23K 9/091 219/130.51 |
| 7,480,124 B2 | * | 1/2009 | Pankau | H02H 3/253 361/111 |
| 2002/0075709 A1 | * | 6/2002 | Schwartz | H02M 7/1623 363/127 |

(Continued)

FOREIGN PATENT DOCUMENTS

| | | |
|---|---|---|
| CA | 2620457 A1 | 3/2007 |
| CN | 205464724 U | 8/2016 |
| JP | 2005020806 A | 1/2005 |

OTHER PUBLICATIONS

PCT, Notification Concerning Transmittal of International Preliminary Report on Patentability, in Application No. PCT/US2019/024940 dated Nov. 12, 2020 (8 pages).

(Continued)

*Primary Examiner* — Michael A Laflame, Jr.
(74) *Attorney, Agent, or Firm* — McAndrews, Held & Malloy, Ltd.

(57) ABSTRACT

A welding-type power supply that receives alternating current (AC) input power and converts the AC input power to direct current (DC) power to provide power for welding tools. The welding-type power supply is configured to detect whether single phase AC power or three-phase AC power is connected to the input of welding-type power supply. Single phase input power may be detected by sampling ripple (Continued)

voltage of the DC power, either synchronously with the AC input power or synchronously with a signal generated by an output of the welding-type power supply.

15 Claims, 6 Drawing Sheets

(56) References Cited

U.S. PATENT DOCUMENTS

| | | | | |
|---|---|---|---|---|
| 2006/0187683 A1* | 8/2006 | Hsieh | ................ | G01R 29/16 |
| | | | | 363/10 |
| 2007/0262065 A1* | 11/2007 | Peters | ................ | B23K 9/32 |
| | | | | 219/130.5 |
| 2009/0101637 A1* | 4/2009 | Geissler | ............ | B23K 9/1062 |
| | | | | 219/660 |
| 2009/0127242 A1* | 5/2009 | Aimi | ................ | B23K 9/0731 |
| | | | | 219/137 PS |
| 2009/0129122 A1* | 5/2009 | Ohashi | ............ | B23K 9/1062 |
| | | | | 363/17 |
| 2010/0026276 A1 | 2/2010 | Wunderlich | | |
| 2010/0308026 A1* | 12/2010 | Vogel | ................ | B23K 9/0953 |
| | | | | 219/130.21 |
| 2010/0308649 A1* | 12/2010 | Kono | ................ | H02M 7/53875 |
| | | | | 307/9.1 |
| 2012/0256547 A1* | 10/2012 | Yang | ................ | H05B 45/3725 |
| | | | | 315/144 |
| 2013/0305760 A1* | 11/2013 | Shinomoto | ............ | F04B 39/06 |
| | | | | 62/238.7 |
| 2013/0313059 A1* | 11/2013 | Inarida | ................ | B60L 9/28 |
| | | | | 191/57 |
| 2014/0035492 A1* | 2/2014 | Ahmed | ............ | H02M 5/4585 |
| | | | | 318/400.3 |
| 2014/0214343 A1 | 7/2014 | Bengtsson | | |
| 2014/0254217 A1 | 9/2014 | Li | | |
| 2015/0053660 A1* | 2/2015 | Schartner | ............ | H02M 3/285 |
| | | | | 219/130.1 |
| 2015/0060426 A1* | 3/2015 | Schartner | ............ | B23K 9/173 |
| | | | | 219/130.21 |
| 2015/0174693 A1* | 6/2015 | Astle | ................ | B23K 9/1043 |
| | | | | 219/113 |
| 2016/0144442 A1* | 5/2016 | Tanaka | ................ | B23K 9/0953 |
| | | | | 219/130.21 |
| 2018/0138853 A1* | 5/2018 | Tseng | ................ | H02P 6/14 |
| 2019/0036462 A1* | 1/2019 | Tazaki | ................ | B60L 53/22 |

OTHER PUBLICATIONS

PCT, Notification of Transmittal of the International Search Report and the Written Opinion of the International Searching Authority, or the Declaration, in International Application No. PCT/US2019/024940, dated Aug. 5, 2019 (12 pages).

* cited by examiner

SINGLE PHASE INPUT DETECTION AND POWER SOURCE PROTECTION

BACKGROUND

Conventional welding-type power sources provide power for welding-type tools. In some systems, a direct current (DC) power bus provides welding type power for welding-type tools and auxiliary outputs. Welding-type power sources may be supplied with either single phase or three-phase Alternating Current (AC) input power. Some equipment may be designed to only work with a three-phase AC power supply. Therefore, systems and methods to detect the connection of single phase AC input power to the welding-type power supply are desirable.

SUMMARY

Apparatus, systems, and methods are disclosed for detecting the connection of a single phase AC input connection to a welding-type power supply, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Welding-type power supplies may be supplied with either single phase or three-phase input power. Some equipment may only be designed to operate with a three-phase supply for various reasons. This equipment may be subject to damage when operated with a single phase input if the output power is sufficiently high. Operating from a single phase requires a higher RMS and peak input current for the same output power. As a result, input rectifier(s), input inductor(s) (or DC link chokes), DC link capacitors, input power cords, and/or other input related circuitry may be thermally stressed under a single phase condition. Therefore, to protect the equipment from damage, it is advantageous to reduce the effects of, or prevent entirely, single phase operation in a welding-type power source that is not designed to operate under a single phase condition.

Conventionally, single phase operation can be detected using several approaches. Two conventional, direct approaches include measuring phase-to-phase voltages or phase currents of the input. A drawback to these methods is that phase-to-phase voltages or phase currents are not typically measured in a welding-type power supply, and measuring phase-to-phase voltages or phase currents would require additional circuitry and cost to implement. An approach to detect single phase operation that does not require additional circuitry to be added to the welding-type power supply is therefore desirable.

Disclosed example systems and methods detect single phase operation in a welding-type power supply without substantial (or any) additional circuitry or substantial (or any) additional cost to implement. The present disclosure, described in more detail below, relates to a system and method of measuring the ripple voltage on the DC power bus. Single phase operation results in a larger DC power bus ripple voltage than three-phase operation. In order to account for any distortion caused by a load, the DC power bus ripple may be measured synchronously with the AC input, and a processor may compare changes in DC power bus ripple voltage in order to determine whether a single phase AC input power condition exists. Although described in relation to a welding-type power supply, the systems and methods described in this disclosure could be used to detect single phase inputs to any system that converts AC input power to DC power.

Disclosed example welding-type power supplies include an input configured to receive three-phase alternating current (AC) input power; a rectifier circuit configured to convert the AC input power to direct current (DC) power; and a processor configured to detect whether single-phase AC power is coupled to the input by monitoring voltage samples of the DC power using a voltage sampling timing based on a frequency and voltage of AC power connected to the input. In some examples, the processor is configured to compare voltage differences between the voltage samples of the DC power to detect whether single-phase AC power is coupled to the input.

In some examples, the processor is configured to detect zero-crossings of at least one leg of the AC input power. In some examples, the processor is configured to monitor voltage samples of the DC power at a predetermined period of time after detecting a zero-crossing. In some examples, the processor is configured to power down the welding-type power supply in response to detecting that single-phase AC power is coupled to the input.

Some example welding-type power supplies further include a power inverter configured to convert the DC power to output power. In some examples, the processor is configured to shut down the power inverter in response to detecting that single-phase AC power is coupled to the input. In some examples, the processor is configured to limit one of the output current or duty cycle of the power inverter in response to detecting that single-phase AC power is coupled to the input. In some examples, the processor is configured to signal an alarm in response to detecting that single-phase AC power is coupled to the input.

Disclosed example welding power supplies include an input configured to receive three-phase alternating current (AC) input power; a rectifier circuit configured to convert the AC input power to direct current (DC) power; and a processor. The processor is configured to monitor the AC input power; and sample, synchronously with the AC input power, pairs of voltage measurements of the DC power; where each pair includes a first measured voltage of the DC power; and a second measured voltage of the DC power, the second measured voltage of the DC power sampled a first time period after the first measured voltage, the first time period based on the AC input power. The processor is also configured to determine voltage differences for the sampled pairs of voltage measurements; compute a filtered voltage difference between the sampled pairs of voltage measurements; and compare the filtered voltage difference to a threshold voltage difference to determine whether single-phase AC power is coupled to the input.

In some examples, the processor is further configured to detect a period of the AC input power. In some examples the first time period is one sixth of the period of the AC input power. In some examples, the processor is configured to monitor the AC input power via monitoring one leg of the AC input power. In some examples, the processor is configured to detect zero-crossings of the monitored leg of the AC input power, and for each sampled pair of voltage measurements, sample the first measured voltage a second time period after detecting a corresponding one of the zero-crossings.

Disclosed methods of detecting whether single phase alternating current (AC) power is connected to an input of a welding-type power supply include providing AC input power to the input; converting, via a rectifier circuit, the AC input power to direct current (DC) power; and detecting whether single-phase AC power is coupled to the input by monitoring voltage samples of the DC power using a voltage sampling timing based on a frequency and voltage of AC power connected to the input.

Some methods of detecting whether single phase alternating current (AC) power is connected to an input of a welding-type power supply further include comparing voltage differences between the voltage samples of the DC power to detect whether single-phase AC power is coupled to the input. Some methods of detecting whether single phase alternating current (AC) power is connected to an input of a welding-type power supply further include detecting zero-crossings of at least one leg of the AC input power, and wherein voltage samples of the DC power are monitored at a predetermined period of time after detecting a zero-crossing.

Some methods of detecting whether single phase alternating current (AC) power is connected to an input of a welding-type power supply further include powering down the welding-type power supply in response to detecting that single-phase AC power is coupled to the input. Some methods of detecting whether single phase alternating current (AC) power is connected to an input of a welding-type power supply further include shutting down a power inverter configured to convert the DC power to output power in response to detecting that single-phase AC power is coupled to the input. Some methods of detecting whether single phase alternating current (AC) power is connected to an input of a welding-type power supply further include limiting one of the output current or duty cycle of a power inverter configured to convert the DC power to output power, in response to detecting that single-phase AC power is coupled to the input. Some methods of detecting whether single phase alternating current (AC) power is connected to an input of a welding-type power supply further include signaling an alarm in response to detecting that single-phase AC power is coupled to the input.

Disclosed example welding power supplies include an input configured to receive three-phase alternating current (AC) input power; a rectifier circuit configured to convert the AC input power to direct current (DC) power; an output configured to provide power to a load, the output comprising a waveform generator; and a processor. The processor is configured to detect whether single-phase AC power is coupled to the input by monitoring voltage samples of the DC power using a voltage sampling timing based on an output signal generated by the waveform generator.

Figure 1:
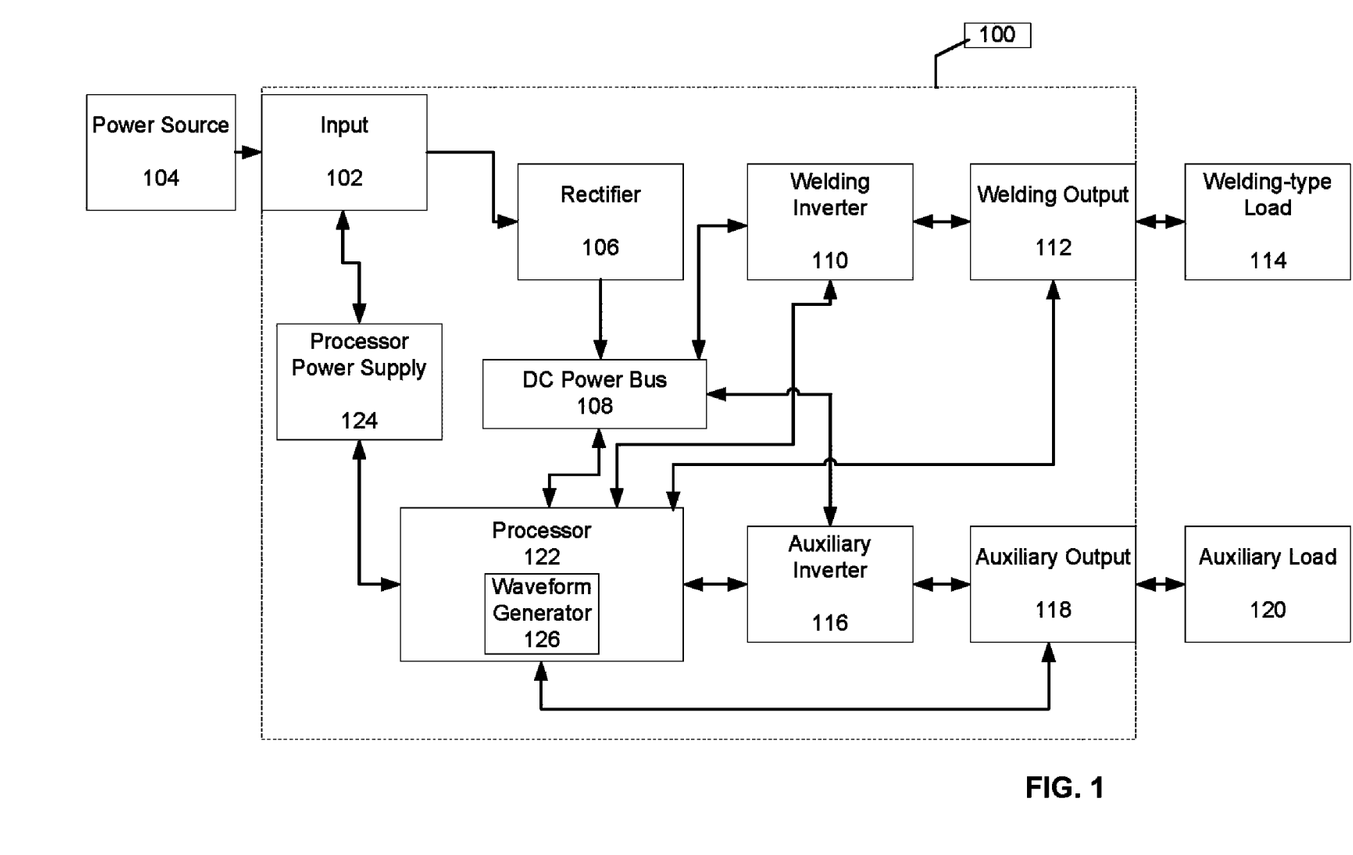
FIG. 1 is a block diagram of an example welding-type power system in accordance with aspects of this disclosure.

FIG. 1 is a block diagram of an exemplary welding-type power supply 100. The welding-type power supply includes an input 102 configured to receive AC input power from a power source 104. The power source 104 may be the AC power grid, an engine/generator set, or a combination thereof. The power source 104 may provide single phase AC power or three-phase AC power to the input. The welding-type power supply 100 also includes a rectifier circuit 106 to condition the AC power received at the input 102 to DC power at a DC power bus 108. A welding inverter 110 provides power from the DC power bus 108 to a welding output 112. The welding output 112 provides welding-type power to a welding-type load 114, for example a welding torch. An auxiliary inverter 116 provides power from the DC power bus 108 to an auxiliary output 118, which provides power to an auxiliary load 120. Auxiliary type loads may include lighting, small power tools, etc.

A processor 122 is connected to the DC power bus 108, and the welding inverter 110. The processor 122 is powered by a processor power supply 124, which may be, for example, a power transformer that draws power from a single phase of the AC power connected to the input 102. Alternatively, the processor 122 may be powered by the DC power bus 108. As described in more detail below, the processor 122 measures the ripple voltage on the DC power bus 108 in synchrony with AC input power to determine if single phase power is connected to the input 102. The processor 122 may include a waveform generator 126. For pulse welding processes (e.g., pulsed MIG or pulsed TIG), the processor 122 may use the waveform generator 126 to control the pulse welding waveform by controlling the welding inverter 110.

When the processor 122 determines that single phase power is connected to the input, the processor 122 can take steps to protect the welding-type power supply, or equipment powered by the welding-type power supply from damage. In some examples, the processor 122 may power down the welding-type power supply 100 in response to determining that single phase power is connected to the input 102. Additionally or alternatively, the processor 122 may disable the welding output 112 and/or the auxiliary output 118, and/or may limit the output of the welding inverter 110 to less than a threshold power level. The threshold power level may be a threshold current, a threshold duty cycle, and/or any other threshold power level that limits the heat generated by the rectifier 106, the welding inverter 110, and/or the auxiliary inverter 116. In some examples, the processor 122 may signal an alarm to indicate that single phase power is connected to the input 102. For example, the welding type power supply 100 may include speakers or a display through which an alarm indicating that single phase power is connected to the input 102 of the welding-type power supply 100 may be signaled to an operator, who may then take steps to protect the welding-type power supply 100 or equipment connected to the welding-type power supply 100.

Figure 2A:
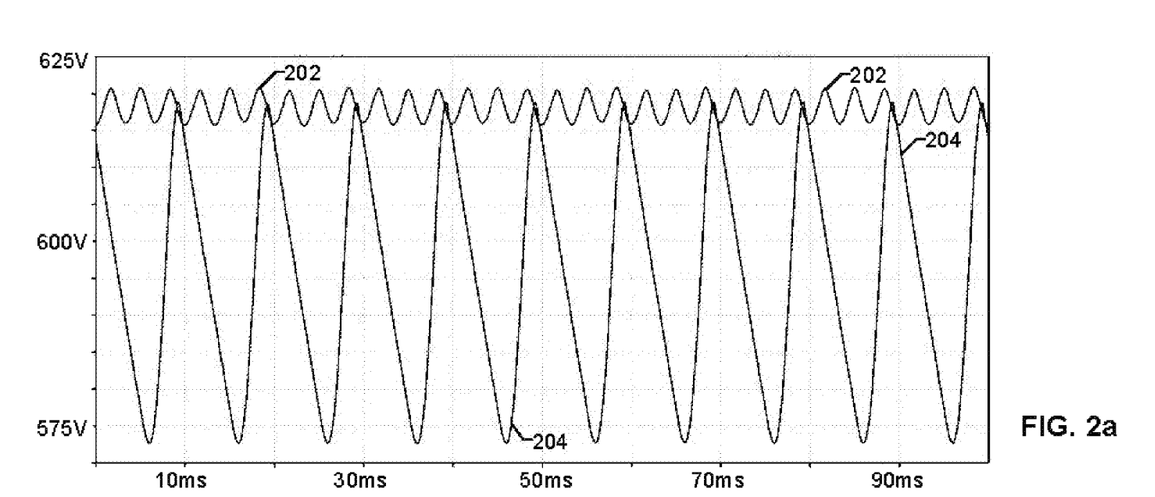
FIG. 2a is a waveform diagram showing example ripple voltages on the DC power bus of FIG. 1 in response to a single phase input and a three-phase input.

As shown in FIG. 2a, single phase AC input will result in a larger DC power bus voltage ripple than a three-phase AC input. In FIG. 2a, waveform 202 shows a measured DC power bus ripple voltage under a three-phase input, and waveform 204 shows a measured. DC power bus ripple voltage with a single phase input under the same output power load. However, the output power 114, 118 also influences the DC power bus 108. If the output load(s) 114, 120 have large dynamic swings as can occur in pulse welding processes, the output(s) 114, 120 can impose a significant ripple component on an unregulated DC power bus 108. A ripple component caused by the load(s) 114, 120 may be larger than the ripple component caused by the power source 104. Therefore, only monitoring peak-to-peak ripple on the bus could lead to a false indication of single phase operation if the output-induced ripple exceeds a detection threshold setup for single phase.

Figure 2B:
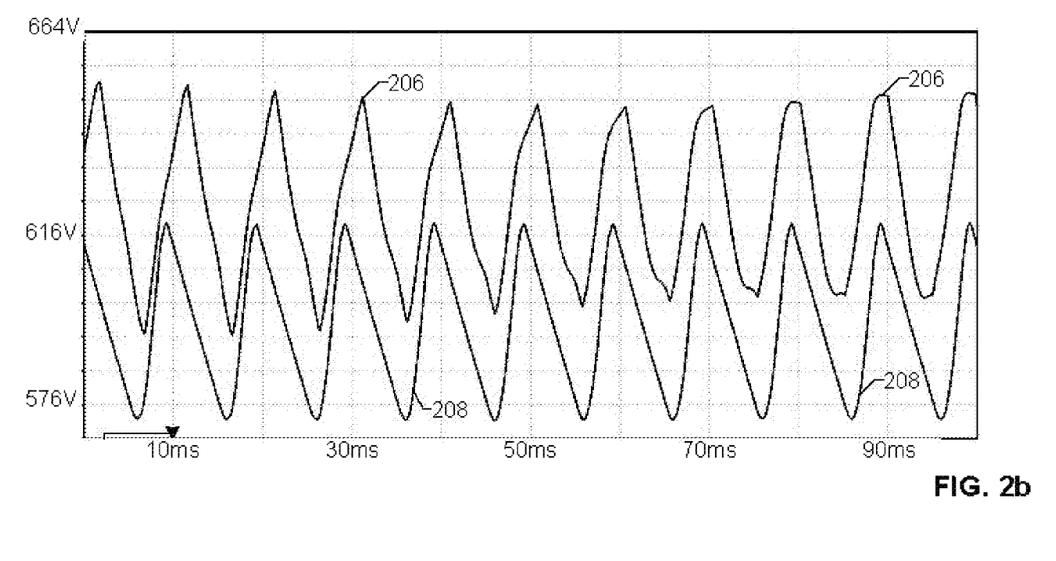
FIG. 2b is a waveform diagram showing example ripple voltages in response to a single phase input and a three-phase input.

FIG. 2b illustrates the DC power bus 108 voltage ripple fora single-phase input with a constant load (waveform 206), and a three-phase input with a pulsed load (waveform 208). FIG. 2b thus illustrates how a dynamic output can create DC power bus disturbances that are similar the disturbances created by a single phase AC input.

In some examples, the processor 122 detects the frequency of the ripple on the DC power bus 108. The voltage ripple frequency on the DC power bus 108 is approximately twice the AC input frequency when the input power is single phase, and is approximately six times the AC input frequency when the input power is three-phase (120 Hz and 360 Hz respectively for 60 Hz mains). The processor 122 performs a fast Fourier transform (FFT) or other method of determining the ripple frequency of the DC power bus 108 to determine whether the input is single or three-phase.

The processor 122 determines the frequency of the ripple on the DC power bus 108, and compares the frequency to the AC input frequency (e.g., measured or known) and/or to a threshold frequency between twice the AC input frequency and six times the AC input frequency. If the ripple frequency is twice the AC input frequency or less than the threshold frequency, then the processor 122 determines that single phase AC power is connected to the input 102. Conversely, if the ripple frequency is six times the AC input frequency or greater than the threshold frequency, then the processor 122 determines that three-phase AC power is connected to the input 102.

Additionally or alternatively, the processor 122 determines whether single phase or three-phase power is connected to the input 102 by sampling the DC power bus ripple voltage in synchrony with the AC input. As described in more detail below, sampling in synchrony with the AC input is an effective technique to determine whether single phase power is connected to the input 102.

Figure 3A:
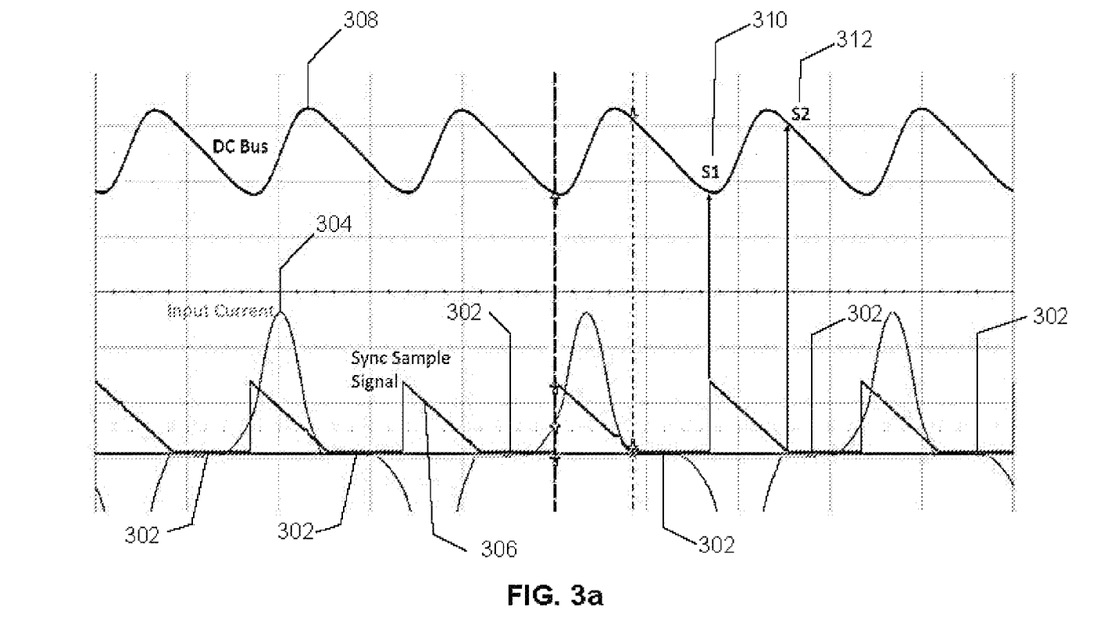
FIG. 3a is a waveform diagram showing an exemplary sampling timing of a DC power bus ripple voltage.

FIG. 3a shows exemplary waveform diagrams that illustrate the synchronous sampling method used to determine if single or three-phase AC power is connected to the input. The processor 122 monitors the AC input power. In some examples, the processor 122 may monitor the power supplied to the processor power supply 124, which may be a control power line supplied by a power transformer that operates from a single phase (two of the three legs) of the AC power connected to the input 102. In some examples, the processor 122 may directly monitor one of the phases (also referred to as legs) of the AC input power.

Referring to FIG. 3a, the processor 122 monitors for zero crossings 302 of the AC input power signal 304 that the processor 122 is monitoring. In the example of FIG. 3a, the processor 122 detects positive zero crossings, but may alternatively detect negative zero crossings (or both). As the AC input power signal 304 is periodic, zero crossings 302 occur periodically. A first predetermined period of time after detecting a zero crossing 302, the processor 122 takes a first sample 310 of the DC power bus voltage 308. A second predetermined period of time after taking the first sample 310, the processor 122 takes a second sample 312 of the DC power bus voltage 308. In some examples, the second predetermined period of time is $\frac{1}{6}^{th}$ of the period of the AC input 304.

To take the first sample 310 and the second samples 312 at the appropriate times (e.g., in synchrony with the AC input power signal 304 based on the zero crossings 302), the processor 122 generates a sync sample signal 306 in response to a zero crossing 302. The sync sample signal 306 indicates the timing to take the first sample 310 and the second sample 312. For example, the sync sample signal may be a counter that starts a predetermined period of time after the detection of a zero crossing 302 and counts the time between samples to indicate to the processor 122 when to take the first sample 310 and the second sample 312.

The sync sample signal 306 may be generated a first predetermined time period after the detection of a zero crossing 302. The first predetermined time period is determined based on the loads, line frequencies, line impedances, DC link inductances, and DC power bus 108 capacitance. The choice to delay sampling after detecting a the zero crossing is due to the LC filtering on the DC power bus 108 voltage provided by the input inductor and DC bus capacitors. For example, the first sample 310 is taken 0.22*T after a positive zero crossing 302 is detected, where T is the period of the AC input 304.

After taking the first sample 310 and the second sample 312, the processor 122 computes the voltage difference between the first sample 310 and the second sample 312. This voltage difference is Vbus (the voltage measured on the DC power bus 108) at the second sample 312 minus Vbus at the first sample 310. The processor 122 continues this sampling process N number of times, and accumulates the voltage difference for each sampling process. At the end of N samples, a filtered (e.g., an average, median, etc.) voltage difference between the first sample 310 and the second sample 312 is computed by the processor 122. If the filtered voltage difference is above a predetermined threshold, then the processor 122 determines that single phase AC power is connected to the input 102.

There are several advantages to taking the second sample 312 at T/6 after the first sample 310 is taken, where T is the period of the AC input 304. First, when using T/6 as the predetermined time between first and second samples (310 and 312), the average difference between the first and second samples (310 and 312) when connected to three-phase power will be zero, because the period of the DC power bus ripple caused by a three-phase input is T/6. Therefore, 2 samples (310 and 312) at T/6 apart will be at the same point in the DC ripple waveform when three-phase input power is connected. Using T/6 as the time between first and second samples (310 and 312) therefore reduces the possibility of falsely identifying three-phase as single-phase, because the average difference should be near zero if three-phase input power is connected. Additionally, based on experimental data and simulation, taking the second sample at T/6 results in the near the peak of the bus ripple caused by a single phase input. Single phase bus ripple is often not symmetrical, but rather is similar to a sawtooth that charges up quickly and takes longer to bleed down.

Figure 3B:
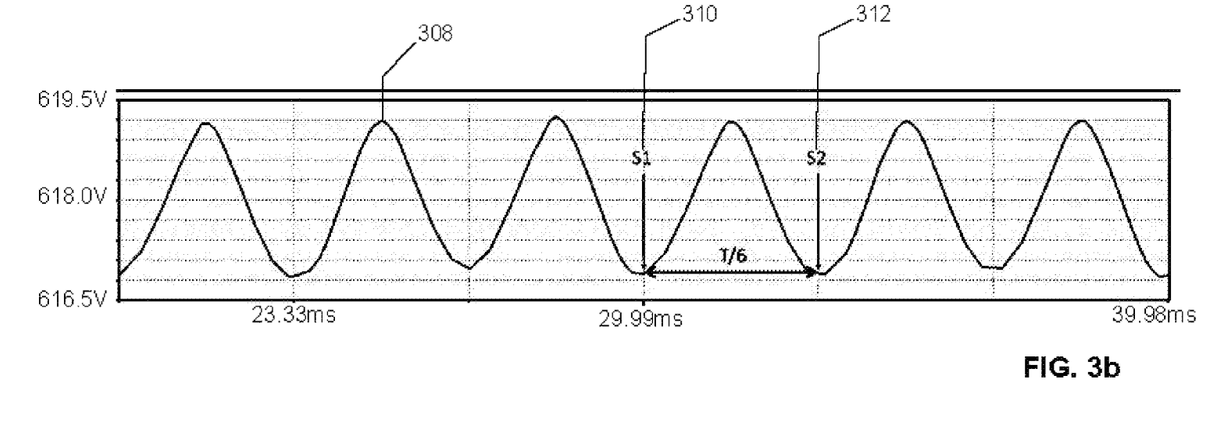
FIG. 3b is a waveform diagram showing an exemplary sampling timing of a DC power bus ripple voltage with a three-phase input.
Figure 3C:
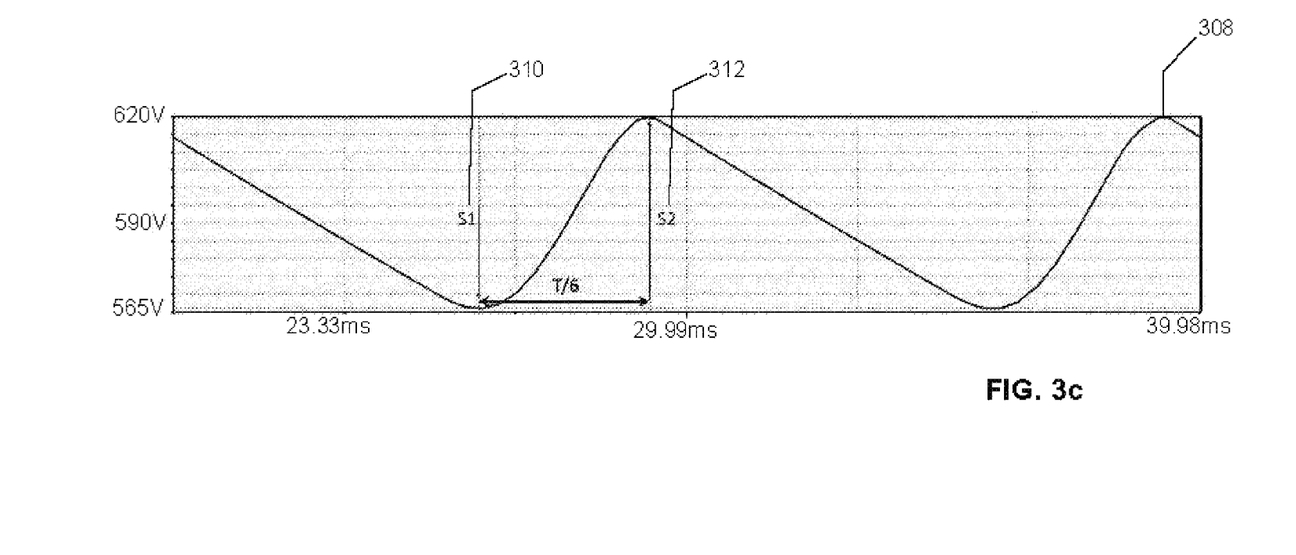
FIG. 3c is a waveform diagram showing an exemplary sampling timing of a power bus ripple voltage with a single phase input.

FIGS. 3b and 3c show these advantages of spacing the first and second samples (310 and 312) at T/6. FIG. 3b illustrates spacing first and second samples (310 and 312) at T/6 when the AC input is three-phase. The difference between the first sample 310 and the second sample 312 is substantially zero, regardless of at the moment in the AC cycle at which the sampling is synchronized. Conversely, FIG. 3c illustrates spacing first and second samples (310 and 312) at T/6 when the AC input is single phase. The difference between the first sample 310 and the second sample 312 is substantially higher, and may approach the peak-to-peak voltage. Therefore, when averaged over N sampling periods, the average difference between first samples 310 and 312 when the input is single phase AC power will be significantly higher than when the input is three phase AC power.

The DC power bus sampling and difference calculation may be performed in different manners using different filters or selecting different points on the input waveform, provided that the sampling is done synchronously to the input line so that any disturbance in the bus not caused by the input line (e.g., by interference in the output), would be mitigated (e.g., averaged out, minimized), and that the timing is selected such that the difference between the first and second DC power bus voltage samples (310 and 312) remains above a threshold if single phase AC power is connected to the input 102. For example, shifting the first sampling time after detecting a zero-crossing 302 may decrease the filtered voltage difference between first and second DC power bus voltage samples (310 and 312) when single phase AC power is connected to the input 102, which could cause a failure to detect a single phase AC input.

By computing the difference in bus voltage 308 synchronously with the AC input 304 and filtering (e.g., averaging over time), the processor 122 rejects perturbations that are not synchronous to the AC input frequency. For a sufficiently large collection of samples, it is unlikely that any output load power variations would be synchronous to the line, therefore the contribution to bus ripple from the load would filter out to nearly zero. If desired, the output power could be controlled so as not to have pulsed loads at 2*(AC input frequency) to ensure that the output load is not synchronized with the line.

In some examples, the AC input frequency (e.g., 50 Hz, 60 Hz, 400 Hz, etc.) may be programmed into memory of the processor 122. In such examples, the period between first and second samples (310 and 312) is predetermined based on the programmed AC input frequency. Alternatively, the processor 122 may be configured to determine the frequency of the AC input 304. The processor 122 may use one of several methods to determine the frequency of the AC input 304. In one example, the processor 122 may utilize an FFT to determine the frequency of the AC input 304. In another example, the processor 122 may determine the frequency of the AC input 304 by calculating the time between zero crossings 302 of the AC input 304. After computing the frequency of the AC input 304, the processor 122 may then set the period between the first and second samples (310 and 312) based on the computed AC input frequency. For example, the processor 122 may set the period between the first and second samples (310 and 312) at T/6, where T is the period of the AC input 304.

In some examples, the DC power bus ripple may be sampled synchronously with a pulsed load 114 rather than synchronously with the AC input. As explained previously, dynamic outputs may create DC power bus 108 disturbances that are similar to the disturbances created by a single phase AC input. In such examples where the DC power bus ripple is sampled synchronously with the load, the processor 122 includes a waveform generator 126. The processor 122 uses the waveform generator 126 to control the waveform produced by the welding inverter 110. The processor 122 samples the DC power bus ripple synchronously with the signal generated by the waveform generator 126 to determine whether single phase or three-phase AC input power is connected to the welding-type power supply 100. In such examples, the processor 122 may take first and second samples (310 and 312) of the DC power bus voltage at times based on the output waveform produced by the welding inverter 110 and controlled by the waveform generator 126. If the filtered difference between a series of first and second DC power bus 108 voltage samples (310 and 312) exceeds a threshold difference, then the processor 122 determines that single phase power is connected to the input 102. Sampling timings may be based on known responses to certain pulsed output waveforms controlled by the waveform generator 126.

Figure 4:
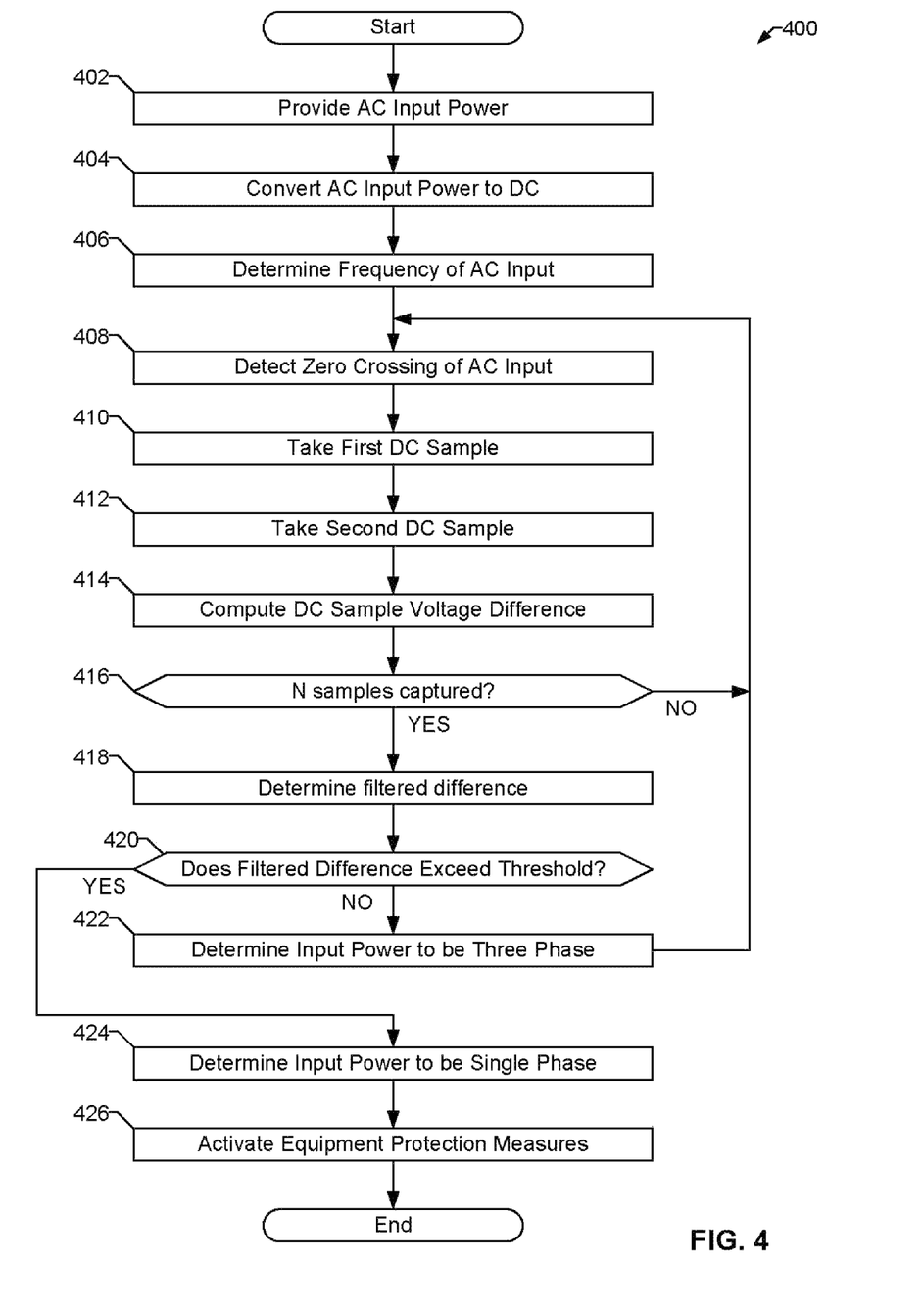
FIG. 4 is flow chart of an exemplary method of detecting a single phase input in accordance with aspects of this disclosure.

FIG. 4 illustrates an example method 400 used to determine if single phase or three-phase power is connected to the input of a welding-type power supply. At block 402, AC power is provided to the input 102 of the welding-type power supply. At block 404, the input AC power is rectified to DC power.

At block 406, the processor 122 determines the frequency of the AC power provided to the input (the AC input power). In some examples, the processor 122 detects zero crossings of at least one leg of the AC input power. For example, the processor 122 may monitor a control power line that is supplied by a power transformer that operates from a single phase of the AC power connected to the input of the welding-type power supply. The processor 122 can monitor the time between zero crossings of the control power line in order to determine the frequency of the AC input power. In some examples, the processor 122 may monitor a single leg of the AC input power directly for zero crossings to determine the frequency of the AC input power. Other methods may also be used to determine the AC input frequency. In some examples, the welding-type power supply may only be configured to accept AC power of a single frequency (for example, 50 Hz, 60 Hz, 400 Hz). In such examples, the processor 122 may not detect the frequency of the AC input.

After determining frequency of the AC input, at block 408, the processor 122 detects a zero crossing of the AC input. As in block 406, the processor 122 may monitor a single leg of the AC input power, for example by monitoring control power line that is supplied by a power transformer that operates from a single phase of the AC power connected to the input of the welding-type power supply. At block 408, the processor 122 monitors for zero crossings of the monitored AC input leg.

A predetermined period of time after detecting a zero crossing, at block 410 the processor 122 takes a first voltage sample of the DC power. At block 412, a predetermined time period after taking the first sample, the processor 122 takes a second voltage sample of the DC power. At block 414, the processor 122 computes the difference between the first DC voltage sample and the second DC voltage sample. To eliminate errors, the processor 122 repeats blocks 408-414 a predetermined N number of times. At block 416, the processor 122 checks if blocks 408-414 have been repeated N times. If blocks 408-414 have not been repeated N times, then the processor 122 goes back to block 408 to repeat blocks 408-414. If blocks 408-414 have been repeated N times, then the processor 122 proceeds to block 418.

At block 418, the processor 122 computes a filtered voltage difference of the computed voltage differences from the N repetitions of blocks 408-414. For example, the processor 122 may compute the mean of the computed voltage differences of the N repetitions. To compute the mean, the processor 122 sums the computed voltage differences and divides the sum by N.

At block 420, the processor 122 compares the filtered difference computed in block 418 to a threshold difference. If the filtered difference exceeds the threshold, then the processor 122 determines that single phase AC power is connected to the input. If the filtered difference is below the threshold, then the processor 122 determines that three-phase AC power is connected to the input. If three-phase AC power is connected to the input 102 (block 422), the welding-type power supply may continue normal operation. In some examples, the processor 122 may continue to monitor for a single phase AC input power condition even after determining that three-phase power AC is connected to the input. Therefore, the processor 122 may return to block 408 and repeat blocks 408-420. A welding-type power supply may continuously monitor for single phase AC input power because for example, a fault on an input line may cause three-phase AC power supplied to the input to become single phase AC power. Therefore, the processor 122 may be configured to continuously monitor for a single phase AC input power condition.

If at block 420, if the filtered difference exceeds the threshold, then the processor 122 determines that single phase AC power is connected to the input (block 424). Then at block 426, the processor 122 can take steps to protect the welding-type power supply or equipment connected to the welding type power supply from damage caused by a single phase AC input. For example, the processor 122 may power down the welding-type power supply in response to determining that single phase power is connected to the input of the welding-type power supply. In some examples, the processor 122 may disable the welding output 112 or the auxiliary output 118. In some examples, the processor 122 may limit the output of the welding inverter 110 to less than a threshold power level. The threshold power level may be a threshold current, a threshold duty cycle, and/or any other threshold power level that limits the heat generated by the rectifier 106, the welding inverter 110, and/or the auxiliary inverter 116. In some examples, the processor 122 may signal an alarm to indicate that single phase power is connected to the input 102. For example, the welding type power supply 100 may include speakers or a display through which an alarm indicating that single phase power is connected to the input 102 of the welding-type power supply 100 may be signaled to an operator, who may then take steps to protect the welding-type power supply 100 or equipment connected to the welding-type power supply 100.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system other apparatus adapted for carrying out the methods described herein is suited. A typical combination of hardware and software may include a general-purpose computing system with a program or other code that, when being loaded and executed, controls the computing system such that it carries out the methods described herein. Another implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components, any analog and/or digital components, power and/or control elements, such as a microprocessor or digital signal processor (DSP), or the like, including discrete and/or integrated components, or portions and/or combination thereof (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   an input configured to receive three-phase alternating current (AC) power;
   a rectifier circuit configured to convert the three-phase AC power received at the input to direct current (DC) power at a DC power bus; and
   a processor configured to:
   monitor a ripple voltage of the DC power at the DC power bus; and
   identify one or more voltage samples of the ripple voltage;
   detect whether a single-phase AC power source or a three-phase power source is coupled to the input based on the one or more voltage samples of the ripple voltage of the DC power using a voltage sampling timing based on a frequency and voltage of AC power connected to the input.

2. The welding-type power supply of claim 1, wherein the processor is configured to compare voltage differences between the one or more voltage samples of the DC power bus to detect whether a single-phase AC power source or a three-phase power source is coupled to the input.

3. The welding-type power supply of claim 1, wherein the processor is configured to:
    detect zero-crossings of at least one leg of the AC input power; and
    monitor the one or more voltage samples of the DC power bus at predetermined periods of time after detecting a zero-crossing.

4. The welding-type power supply of claim 1, wherein the processor is configured to power down the welding-type power supply in response to detecting that a single-phase AC power source is coupled to the input.

5. The welding-type power supply of claim 1, further comprising a power inverter configured to convert the DC power at the DC power bus to output power, wherein the processor is configured to shut down the power inverter in response to detecting that a single-phase AC power source is coupled to the input.

6. The welding-type power supply of claim 1, further comprising a power inverter configured to convert the DC power at the DC power bus to output power, wherein the processor is configured to limit one of the output current or duty cycle of the power inverter in response to detecting that a single-phase AC power source is coupled to the input.

7. The welding-type power supply of claim 1, wherein the processor is configured to signal an alarm in response to detecting that a single-phase AC power source is coupled to the input.

8. A welding-type power supply, comprising:
    an input configured to receive three-phase alternating current (AC) power;
    a rectifier circuit configured to convert the AC power received at the input to direct current (DC) power at a DC power bus; and
    a processor configured to:
        monitor a frequency of the AC power received at the input;
        sample, synchronously with the frequency of the AC power received at the input, one or more pairs of voltage measurements of a ripple voltage on the DC power bus, each pair comprising:
            a first measured voltage of the DC power bus; and
            a second measured voltage of the DC power bus, the second measured voltage of the DC power bus sampled a first period of time after the first measured voltage, the first period of time based on the frequency of the AC power received at the input;
        determine voltage differences for the sampled one or more pairs of voltage measurements;
        compute a filtered voltage difference between the sampled one or more pairs of voltage measurements; and
        compare the filtered voltage difference to a threshold voltage difference; and
        determine that a single-phase AC power source is coupled to the input if the filtered voltage difference is above the threshold voltage difference, and determine that a three-phase AC power source is coupled to the input if the filtered voltage difference is below the threshold voltage difference.

9. The welding-type power supply of claim 8, wherein the processor is further configured to detect a period of the AC power received at the input, and wherein the first time period is one sixth of the period of the AC power received at the input.

10. The welding-type power supply of claim 8, wherein the processor is configured to monitor the AC power received at the input via monitoring one leg of the AC power received at the input.

11. The welding-type power supply of claim 10, wherein the processor is configured to:
    detect zero-crossings of the monitored leg of the AC power received at the input; and
    for each sampled pair of voltage measurements, sample the first measured voltage a second period of time after detecting a corresponding one of the zero-crossings.

12. The welding-type power supply of claim 8, wherein the processor is configured to power down the welding-type power supply in response to detecting that a single-phase AC power source is coupled to the input.

13. The welding-type power supply of claim 8, further comprising a power inverter configured to convert the DC power at the DC power bus to output power, wherein the processor is configured to shut down the power inverter in response to detecting that a single-phase AC power source is coupled to the input.

14. The welding-type power supply of claim 8, further comprising a power inverter configured to convert the DC power at the DC power bus to output power, wherein the processor is configured to limit one of the output current or duty cycle of the power inverter in response to detecting that a single-phase AC power source is coupled to the input.

15. The welding-type power supply of claim 8, wherein the processor is configured to signal an alarm in response to detecting that a single-phase AC power source is coupled to the input.

* * * * *